US007619763B2

(12) United States Patent
Gibson

(10) Patent No.: US 7,619,763 B2
(45) Date of Patent: Nov. 17, 2009

(54) METHOD AND SYSTEM FOR DYNAMICALLY CONFIGURING PRINTING DEVICE SETTINGS

(75) Inventor: Jason Edward Gibson, Eagle, ID (US)

(73) Assignee: Hewlett-Packard Developmen Company, L.P., Houston, TX (US)

( * ) Notice: Subject to any disclaimer, the term of this patent is extended or adjusted under 35 U.S.C. 154(b) by 1178 days.

(21) Appl. No.: 10/650,837

(22) Filed: Aug. 27, 2003

(65) Prior Publication Data

US 2005/0046875 A1 Mar. 3, 2005

(51) Int. Cl.
*G06F 15/00* (2006.01)

(52) U.S. Cl. .................... 358/1.15; 358/1.13; 358/1.14; 358/435; 358/436; 358/440

(58) Field of Classification Search ................ 358/1.13, 358/1.14, 1.15, 435, 436, 440
See application file for complete search history.

(56) References Cited

U.S. PATENT DOCUMENTS 5,434,775 A * 7/1995 Sims et al. ..................... 705/8
6,101,318 A * 8/2000 Hayashi ..................... 358/1.16
6,511,148 B1 * 1/2003 Colombi et al. ............... 347/19
6,574,028 B2 6/2003 Esener et al.
6,658,456 B1 * 12/2003 Shimoosawa ............... 709/206
6,665,715 B1 * 12/2003 Houri ......................... 709/223
7,136,180 B2 * 11/2006 Utsunomiya ............... 358/1.15
7,251,047 B2 * 7/2007 Meade, II .................. 358/1.13
2001/0025307 A1 * 9/2001 Venkatraman et al. ...... 709/218
2003/0135597 A1 * 7/2003 Masuda ...................... 709/223
2004/0046973 A1 * 3/2004 Sugahara et al. ............. 358/1.1
2004/0098471 A1 * 5/2004 Shima ........................ 709/221
2004/0201860 A1 * 10/2004 Nakaoka et al. .............. 358/1.1
2004/0212834 A1 * 10/2004 Edwards et al. ............ 358/1.18

* cited by examiner

*Primary Examiner*—Chan S Park

(57) ABSTRACT

A method of configuring a printing device includes dynamically modifying printing device settings based an identifier in an incoming print job identifying a client submitting the print job.

15 Claims, 4 Drawing Sheets

METHOD AND SYSTEM FOR DYNAMICALLY CONFIGURING PRINTING DEVICE SETTINGS

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Frequently, it is desirable to generate a hardcopy of a document or data set that has been produced or stored on a personal computer. Consequently, a wide variety of printers and printing devices have been developed that can receive a print job from a host computer and produce a hardcopy of the document or data represented by that print job.

As used herein and in the appended claims, the terms "printer" and "printing device" are defined to mean any device that produces a hardcopy from electronic data, including, but not limited to, laser printers, inkjet printers, dot matrix printers, plotters, facsimile machines, digital copiers, photocopiers, multifunction peripherals, and the like. A printer or printing device may produce images on a variety of print media and may produce images that are in color or are monochromatic.

The term "print job" is defined as data that has been specifically formatted for submission to a particular printer from which the printer can generate a hardcopy representing the underlying document or data set from which the print job was created. Typically, the print job is transmitted from a host or "client" computer to the printer.

Most personal computers include programming that will be referred to generally as a "printer driver." A printer driver is a piece of software or firmware that receives data or a document that is to be printed from an application running on the computer. The printer driver formats the data for use by a corresponding printer, i.e., creates a print job, and then transmits the print job to the printer. Using the print job, the printer can produce a hardcopy of the underlying data or document.

Most printing devices employ some type of user interface to allow for human interaction with the device. A user interface enables a user to view and/or modify settings or other information related to the printing device. The settings available on a printing device can allow the user to control certain aspects of the printing process to produce a more desirable hardcopy product. For example, the settings on a printing device may allow the user to select among different available print media. For example, the size, color or type of print medium may be selected for a particular job. Printing device settings may also determine the resolution or quality of the image being printed and, consequently, the amount of ink or toner consumed. The printing device may also be configured to add letterhead, a logo, a signature or other features into a print job being executed. A user interface for controlling these and other printing settings may include a touchpad, keypad, mouse, keyboard, viewable screen, touch screen panel, menus, tabs or other means of navigating through available options, etc.

If a printer is connected to the Internet or World Wide Web (the "web"), the printer may also allow a user or operator to view and/or modify settings and information related to the printing device using a web browser. The web browser displays a web page provided by a web server built into the printing device. The web page or pages containing information about the device and controls for adjusting printer settings are stored in printing device memory.

Configuration settings, such as these, may be specified by the user using the user interface at the printing device. Such settings may also be controlled through the printer driver software. Often, a printing device will have multiple users. As a result, some configuration settings made by one user may be overwritten by a subsequent user, thus requiring each user to check and/or change the settings each time a print job is printed.

SUMMARY

A method of configuring a printing device includes dynamically modifying printing device settings based an identifier in an incoming print job identifying a client submitting the print job.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

This specification describes a method and system for dynamically configuring printing device settings based on an identifier that identifies the location of the client computer submitting a print job. Desired user settings are determined based on the location of the client computer.

When a user creates a print job, the print job is formatted and prepared for transmission from the user's computer to the printer. The formatting process breaks the print job up into a plurality of data packets.

Each data packet includes a header and a portion of the print job data to be printed. The header contains multiple bits of information, some of which indicate where the packet is from, i.e., the client computer sending the print job, and where it is going, i.e., the destination printing device. The client computer and the destination printing device are specified by source and destination Internet Protocol (IP) addresses, respectively.

One or more bits of information stored in the header may be used as an identifier. An identifier may be used to determine the packet's origin, destination, size, etc. An identifier may include, but is not limited to, a name, serial number, Media Access Control (MAC) address, IP address, or any other information that could be used to identify the client machine or the user. In some embodiments, the source IP address is used as the identifier.

An IP address is a 32-bit number that uniquely identifies a machine on a network and on the Internet. As will be explained below, an IP address has two parts most often referred to as the “net” and the “node”. The net is usually the first of four octets (four 8-bit values). The net identifies the network that the IP address belongs to. The last three octets are usually the node. The node identifies the actual machine on the network. Therefore, because the IP address provides information about both the network and the actual machine, IP addresses may be advantageously used as an identifier for determining the location of the client machine.

As the data packets for the print job arrive at the printing device, the location of the sender may be determined by the IP address or other identifier. The printing device is programmed to read the identifier from the data packet header, store the identifier in printer memory, and query a database to determine the location of the machine that sent the print job based on the identifier.

Figure 2:
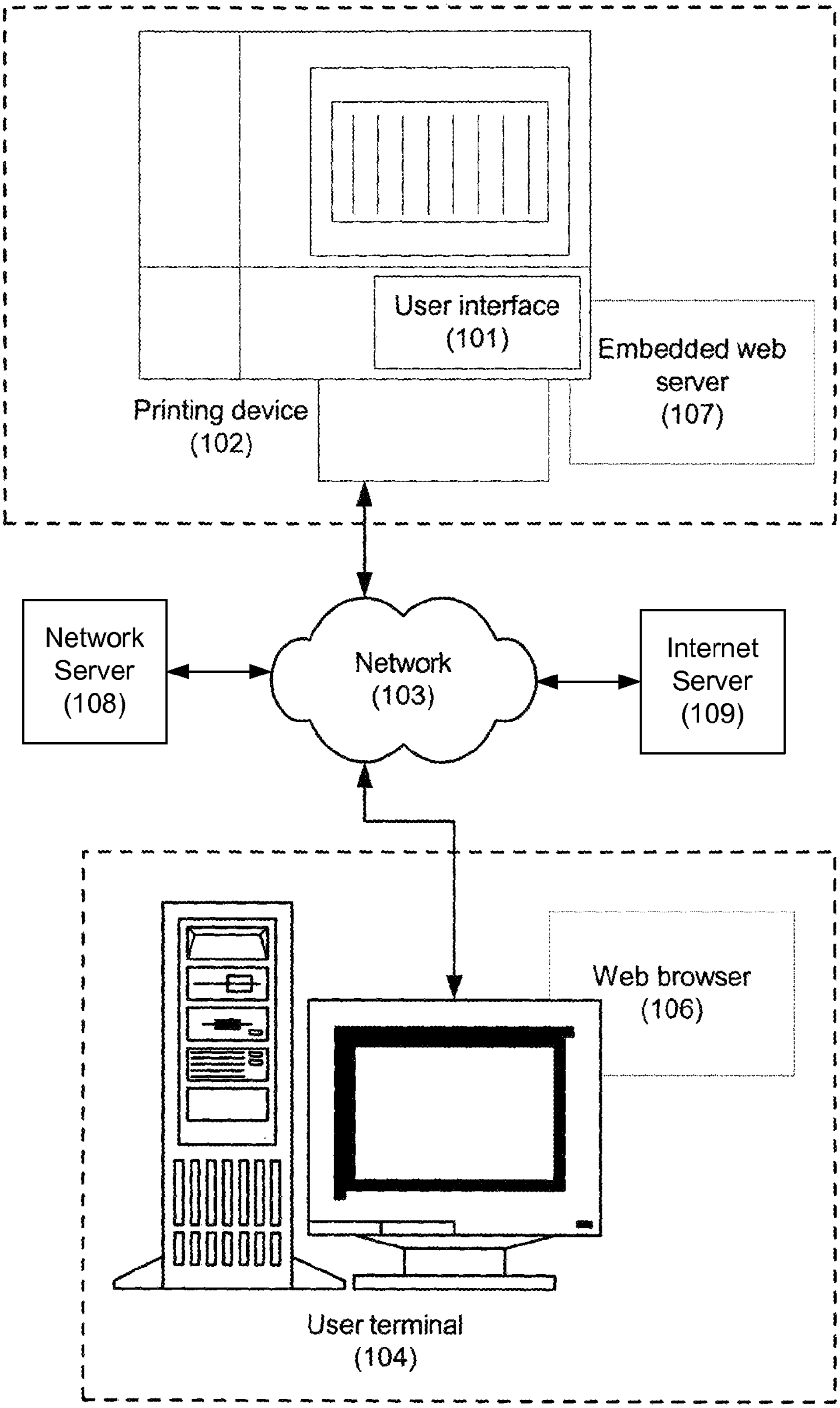
FIG. 2 is a block diagram illustrating a system for interacting with a printing device according to one embodiment.

The database may be stored in printing device memory, on a network sewer (FIG. 2, 108), or on a remote web or Internet server (FIG. 2, 109). The database query is a simple request for all identification information associated with the identifier in the data packet header. The identification information is sent back from the database and used by the printing device, as will be described below. The identification information may be stored in printing device memory. The identification information is then read by the printing device to determine the source of the print job.

When the source or sender of the print job is known, the printing device may be programmed to apply predetermined printing device configuration settings specific to the location of the machine that sent the print job. In one example, two groups of users share a printing device. Each group of users has different needs for the printer and thus uses different settings, such as different types of paper, different paper or ink color, different printed additions to a print job, etc. Each group may program the printing device to automatically configure itself to the group’s predefined settings each time the printing device receives a print job from a machine in that group’s area.

These predefined configuration settings, along with identifier and location information may be stored in table or list form in a database that is stored on or accessible to the printing device. For example, the table or list may contain three columns: one for identifiers, one for locations, and one for configuration settings. Each identifier would be matched with its corresponding location and configuration settings.

For example, the identifier “123.456.789.100” may correspond with “Room #321” for the location and “A4 paper, double sided, company color scheme” for the configuration settings. The database, as previously mentioned, may be stored in printing device memory, on a network server, or on a remote web or Internet server. The identifier, location and corresponding settings may all be chosen by a user, owner, operator, etc. of the printing device.

Alternatively, the database may be broken into two tables or lists. The first table or list matches an identifier with a location that defines the client devices of a particular group. The second table or list matches that location with the predetermined printing device configuration settings for that group. In some embodiments, the database may merely associate the identifier with printing device configuration settings, without specifying the location of the printing device. These processes will be explained in greater detail below.

Figure 1:
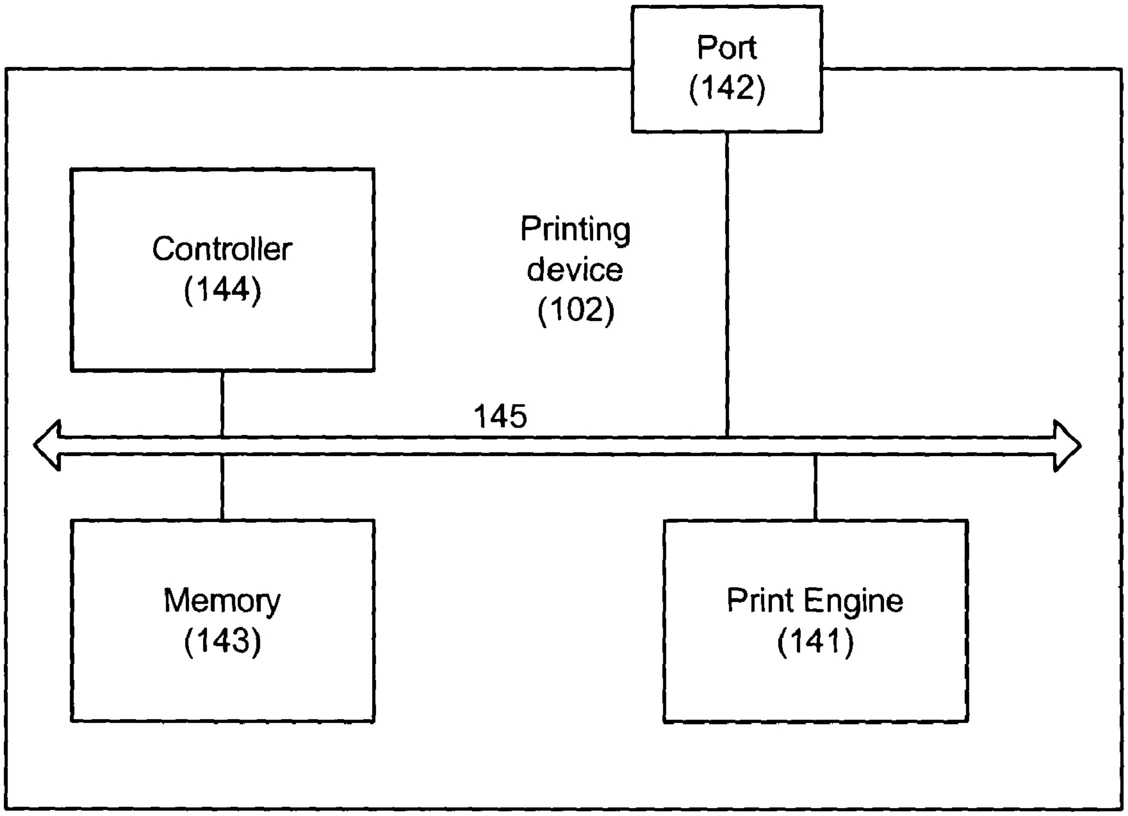
FIG. 1 is a block diagram illustrating the principal parts of a printing device according to one embodiment.

FIG. 1 illustrates the principal internal components of a printing device (102). The various components of the printing device (102) are preferably interconnected by a data bus (145).

As shown in FIG. 1, the printing device (102) includes a controller (144). The controller (144) controls the operation of the printing device (102), including a print engine (141). The print engine (141) includes the components to actually produce print on a print medium. For example, the print engine (141) may be a laser printing engine, an ink-jet print engine, etc. The print engine (141) receives print job data under control of the controller (144) and produces the desired hardcopy.

A memory unit (143) is used to buffer print job data and to store programming for the controller (144). The firmware stored in the memory unit (143) is executed by the controller (144) to provide the functionality of the printing device (102). The memory unit (143) may include a combination of non-volatile memory, e.g., read-only memory (ROM), and volatile memory, e.g., Random Access Memory (RAM). The printing device (102) also includes a port (142) for connecting the printing device (102) to a network or client computer.

As shown in FIG. 2, a printing device (102) may be communicatively connected to a user terminal (104) through a network (103). The network may be a local area network (LAN), intranet, wide area network (WAN), the Internet, etc. The user of the printing device (102) may send a print job from the user terminal (104) to the printing device via the network (103) in order to print the print job.

In some embodiments, the printing device (102) may include an embedded web server (107) for communicating with other computers or printing devices. The phrase “embedded web server” refers to a set of computer-readable instructions (e.g., software or firmware) for providing a printing device with the function or capability of sending data or providing information via a web page. In some embodiments, the embedded web server (107) will incorporate printing device information as well as print job information into a web page, which may be viewed with a web browser (106). In this manner, print job status information may be viewed remotely from a user terminal (104).

Figure 3:
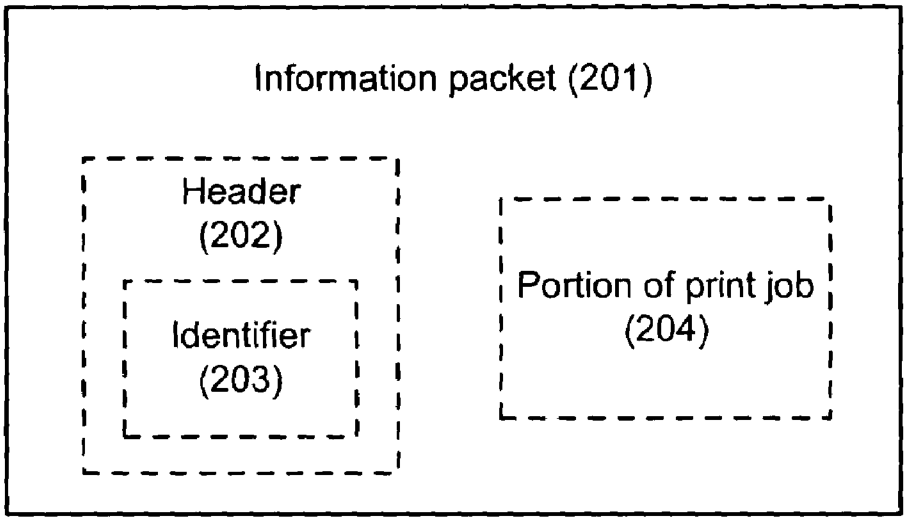
FIG. 3 is a block diagram illustrating a data packet according to one embodiment.

FIG. 3 is a block diagram illustration of a data packet (201). The packet (201) may include a header (202) with an identifier (203) as well as a portion of the print job data that is to be printed (204). The header (202) contains information about the packet (201) such as the source IP address, destination IP address, packet size, checksum value, type of protocol used, etc. The source IP address or any other number or value stored in the data packet header (202) may be used as an identifier (203). The entire data packet, header plus data, is often referred to as a datagram.

Figure 4:
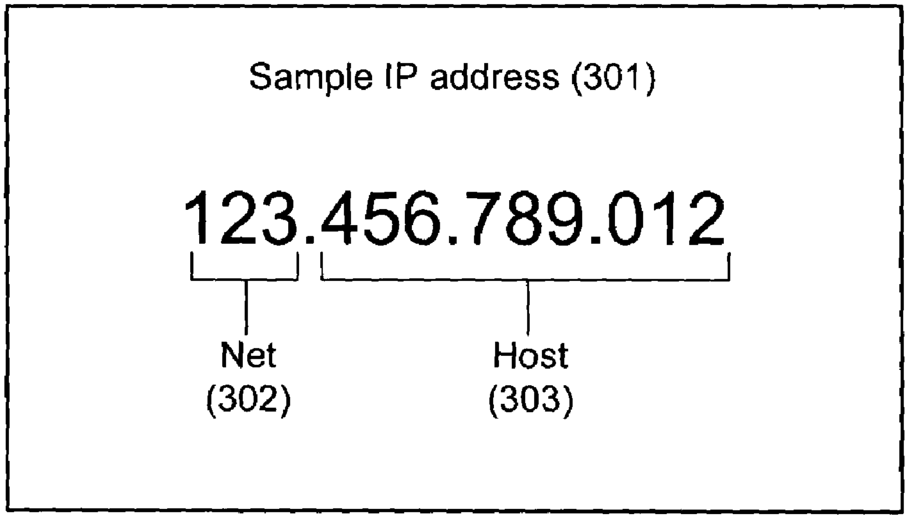
FIG. 4 is a block diagram illustrating a sample IP address with net and host sections according to one embodiment.

FIG. 4 illustrates a sample IP address (301). An IP address (301) is a 32-bit number, divided up into 4 octets, each separated by a period or dot. This is generally referred to as “dotted decimal notation.” The IP address comprises two sections that uniquely identify the machine: the “net” (302) and the “host or node” (303). The net section (302), usually the first octet, identifies the network the machine is connected to. The host section (303), usually the last three octets, identifies the actual machine within the network denoted by the net section.

Each machine on a network (including the Internet) has its own unique IP address, whether the address is static or dynamically assigned using the dynamic host configuration protocol (DHCP). If the physical location and corresponding IP address of each machine is not previously known, an inventory may be taken of the machines on a network to record where each machine, identified by its corresponding IP address, is physically located. This information may be stored in a list or table where each IP address is matched with the physical location of the machine. Once the physical location of the source or sender of the print job is known, printing device configuration settings specific to that machine's location may be applied to the printing device. This process will be explained in greater detail below.

Figure 5:
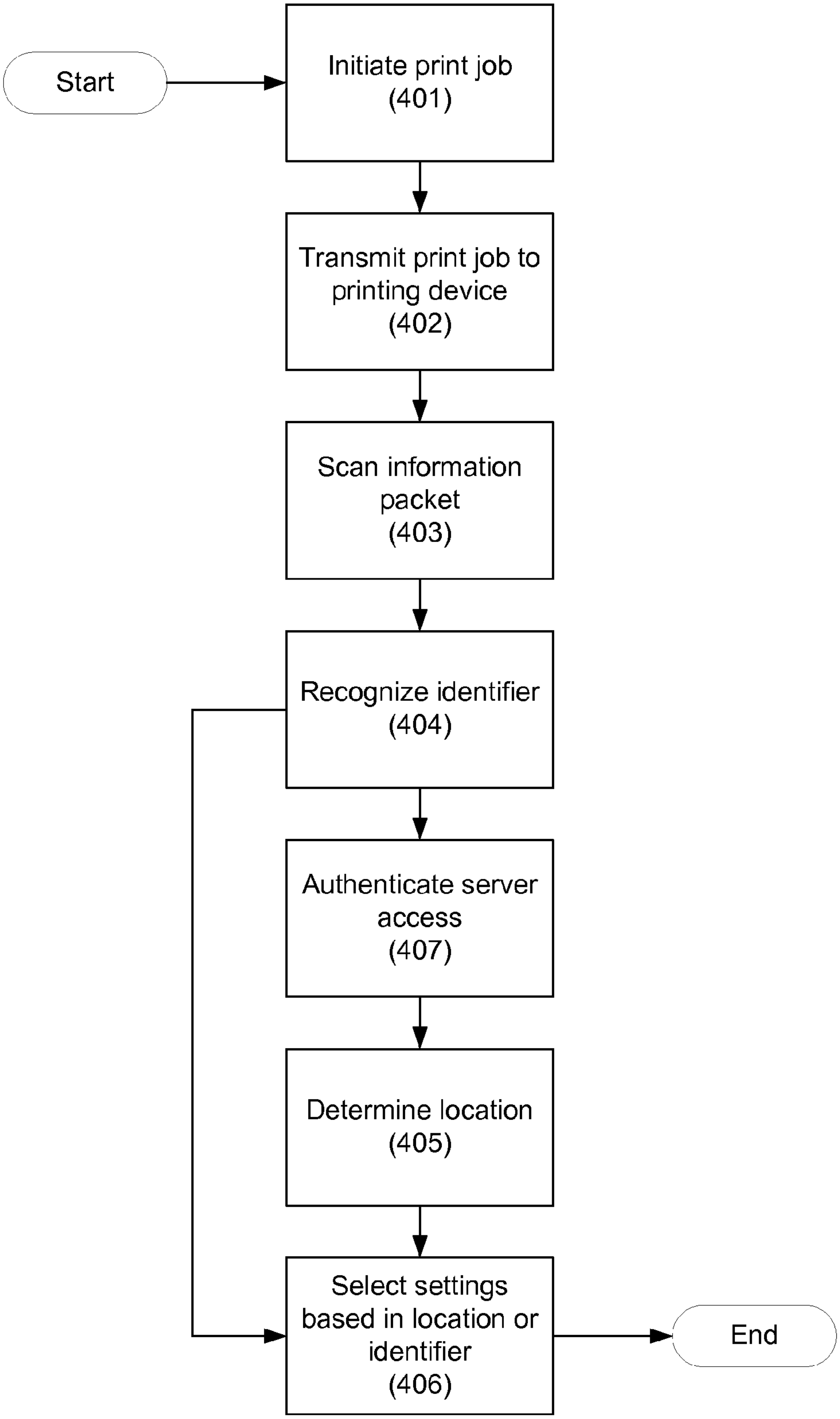
FIG. 5 is a flow chart illustrating a method of configuring printer settings automatically based on locale according to one embodiment.

FIG. 5 is a flowchart describing the process of dynamically configuring a printing device based on the location of the sender of the print job. In one embodiment, the user of a computer will periodically initiate various print jobs (401). Often, the user will desire to print multiple documents, some of which are to be printed on different types of paper or letterhead. Furthermore, the user may wish to print in color using a company color scheme designed to match the company logo.

Such print job variations require different configuration settings to be set on the printing device. Configuration settings may be changed either on the user's computer using the printer driver software or at the printing device itself using the user interface (101, FIG. 2). Users on the same team or workgroup often use similar settings, but when sharing a printing device with other groups, printing device settings may be overwritten.

After the user has initiated the print job (step 401) on the computer, the computer prepares the print job for transmission. The print job is broken down into a plurality of data packets (201). These packets are then transmitted (step 402) over the network (103, FIG. 2) to the destination printing device (102, FIG. 2).

Upon arrival, the packets (201) are scanned by the printing device (102) for an identifier (step 403). The printing device (102) reads the packet header (202) searching for a predetermined identifier (203). When the identifier is found (404), the identifier may be saved in printing device memory and used to determine the physical location of the source of the packet (step 405).

The location of the machine that initiated the print job may be determined from the identifier in the data packet header (202). In one embodiment, the identifier is a source IP address. The printing device user, manager, owner, operator, etc. may program the printing device with a list of known source IP addresses matched with the source IP address's physical location. For example, such a list may include the IP address 123.456.654.321 and its location, "Room #312." In an alternative embodiment, the list may match the IP address or other identifier with a group. The IP address 123.456.789.100 may be matched with the group "Engineers." Each specific group or location may have its own set of configuration settings. Once the group or location is known, the printing device may be configured accordingly (step 406) as explained below.

Alternatively, the location need not be determined. The identifier may be directly associated with a set of printing device configuration settings that are implemented when the appropriate identifier accompanies an incoming print job (step 406).

With appropriate programming, a printing device may be configured to automatically change settings based on the group or location designated by the identifier or the setting associated directly with the identifier. One or more lists of settings may be stored in printing device memory. Such a list would contain all the desired configuration settings for each specific group or location. For example, the list may include settings such as which colors to use, which type of paper, letterhead, logos, personal signatures, size, contrast, or any other viable printing device setting.

Each group or location may have its own list containing settings that are to be changed for a print job from that particular group or location. In one embodiment, this list may be stored in a database on a printing device memory. Alternatively, the database containing the list or lists may be stored on a network server or Internet server, accessible by the printing device using the embedded web server.

In some environments, the printing device may be required to authenticate to the server, local or remote, in order to access the list identifying the physical location and settings to apply to each client machine (FIG. 5, step 407). In some cases, the printing device will automatically return to its default settings after the settings have been configured for a print job from an identified user or machine. Alternatively, the settings may be overwritten by another print job, initiated from a different location.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of configuring a printing device comprising:
scanning data packets of an incoming print job for an identifier identifying a client submitting said print job;
querying a database to determine the physical location of said client based on said identifier;
querying said database to obtain settings for said printing device associated with said physical location; and
configuring said printing device according to said settings associated with said physical location.

2. The method of claim 1, wherein said configuring said printing device occurs automatically when a print job is received.

3. The method of claim 1, wherein said scanning comprises searching header data for said identifier.

4. The method of claim 1, further comprising storing said identifier in printing device memory.

5. The method of claim 1, wherein said database is organized such that each identifier is associated with a set of printing device settings.

6. The method of claim 1, wherein said database is organized such that each identifier is associated with said physical location and a set of printing device settings.

7. The method of claim 1, wherein said database is stored in printing device memory.

8. The method of claim 1, wherein said database is stored on a network server.

9. The method of claim 1, wherein said database is stored on a web server or Internet server.

10. The method of claim 1, further comprising requiring authentication to access said database.

11. The method of claim 6, wherein said database comprises a physical location corresponding to each identifier.

12. The method of claim 11, wherein said physical location comprises a room number or floor number.

13. The method of claim 1, wherein said identifier comprises an IP address.

14. The method of claim 1, further comprising determining a group to which said client belongs based on said identifier.

15. The method of claim 14, further comprising configuring said printing device according to settings specified for members of said group.

* * * * *

UNITED STATES PATENT AND TRADEMARK OFFICE

CERTIFICATE OF CORRECTION

PATENT NO. : 7,619,763 B2
APPLICATION NO. : 10/650837
DATED : November 17, 2009
INVENTOR(S) : Jason Edward Gibson It is certified that error appears in the above-identified patent and that said Letters Patent is hereby corrected as shown below:

On the title page, item (73), Assignee, in column 1, line 1, delete "Developmen" and insert -- Development --, therefor.

Signed and Sealed this

Thirty-first Day of August, 2010

David J. Kappos
*Director of the United States Patent and Trademark Office*